United States Patent
Gordon, II et al.

(10) Patent No.: US 6,727,873 B2
(45) Date of Patent: Apr. 27, 2004

(54) REFLECTIVE ELECTROPHORETIC DISPLAY WITH STACKED COLOR CELLS

(75) Inventors: Joseph G. Gordon, II, San Jose, CA (US); Mark W. Hart, San Jose, CA (US); Anthony C. Lowe, Braishfield (GB); Sally A. Swanson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 09/860,264

(22) Filed: May 18, 2001

(65) Prior Publication Data

US 2002/0171619 A1 Nov. 21, 2002

(51) Int. Cl.[7] .................................................. G09G 3/34
(52) U.S. Cl. ......................................... 345/88; 345/107
(58) Field of Search .......................... 345/88–102, 107, 345/48; 359/296; 399/1, 2; 106/31.1; 430/312, 314, 319, 324; 349/73

(56) References Cited

U.S. PATENT DOCUMENTS

| | | | |
|---|---|---|---|
| 3,612,758 A | 10/1971 | Evans et al. ................ 348/803 |
| 3,668,106 A | 6/1972 | Ota ............................ 358/305 |
| 4,631,244 A | 12/1986 | Mitchell .................... 430/137 |
| 5,200,289 A | 4/1993 | Harrington et al. ......... 430/115 |
| 5,276,438 A | 1/1994 | DiSanto et al. ............ 345/107 |
| 5,279,511 A | 1/1994 | DiSanto et al. ............ 445/24 |
| 5,625,474 A | 4/1997 | Aomori et al. ............... 349/79 |
| 5,745,094 A | 4/1998 | Gordon, II et al. ......... 345/107 |
| 5,801,796 A | 9/1998 | Lowe .......................... 349/73 |
| 5,872,552 A | 2/1999 | Gordon, II et al. ......... 345/107 |
| 5,914,806 A | 6/1999 | Gordon, II et al. ......... 359/296 |
| 6,144,361 A | 11/2000 | Gordon, II et al. ......... 345/107 |
| 6,184,856 B1 | 2/2001 | Gordon, II et al. ......... 345/107 |
| 6,225,971 B1 | 5/2001 | Gordon, II et al. ......... 345/107 |
| 6,337,761 B1 * | 1/2002 | Rogers et al. ............... 359/296 |
| 6,377,757 B2 * | 4/2002 | Matsuura et al. ............. 399/1 |
| 2002/0180688 A1 * | 12/2002 | Drzaic et al. ............... 345/107 |

FOREIGN PATENT DOCUMENTS

| | | | |
|---|---|---|---|
| JP | 1267525 A2 | 10/1989 | ....................... 1/19 |
| WO | WO9428202 | 12/1994 | ....................... 13/6 |

* cited by examiner

Primary Examiner—Vijay Shankar
Assistant Examiner—Nitin Patel
(74) Attorney, Agent, or Firm—Thomas R. Berthold; Daniel E. Johnson

(57) ABSTRACT

A reflective color electrophoretic display intended to be viewed while illuminated from the front window by ambient light and to operate without the need of a backlight has a plurality of laterally adjacent picture elements or pixels. Each pixel is comprised of two or more subpixels, or cells, which are vertically stacked, one directly above the other on the horizontal surface of a reflective panel located at the rear or bottom of the stacks. The cells contain a light-transmissive fluid and charged pigment particles that can absorb a portion of the visible spectrum, with each cell in a stack containing particles having a color different from the colors of the particles in the other cells in the stack.

19 Claims, 8 Drawing Sheets

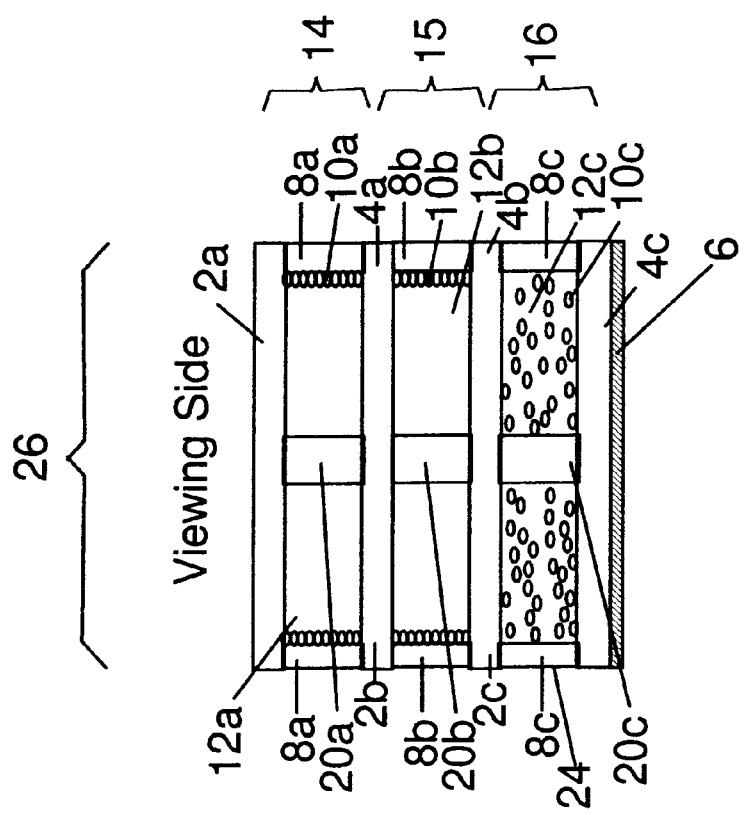
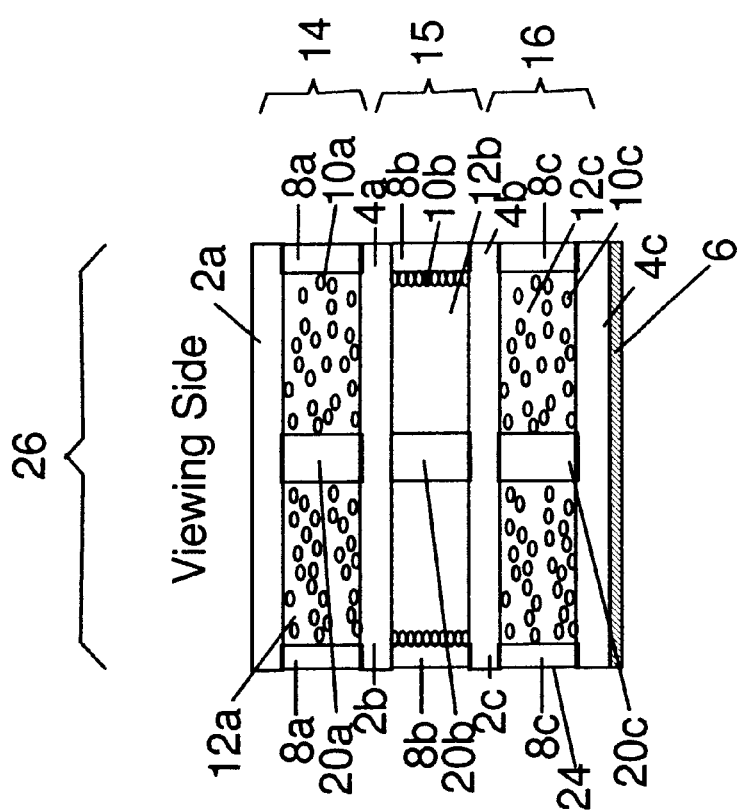

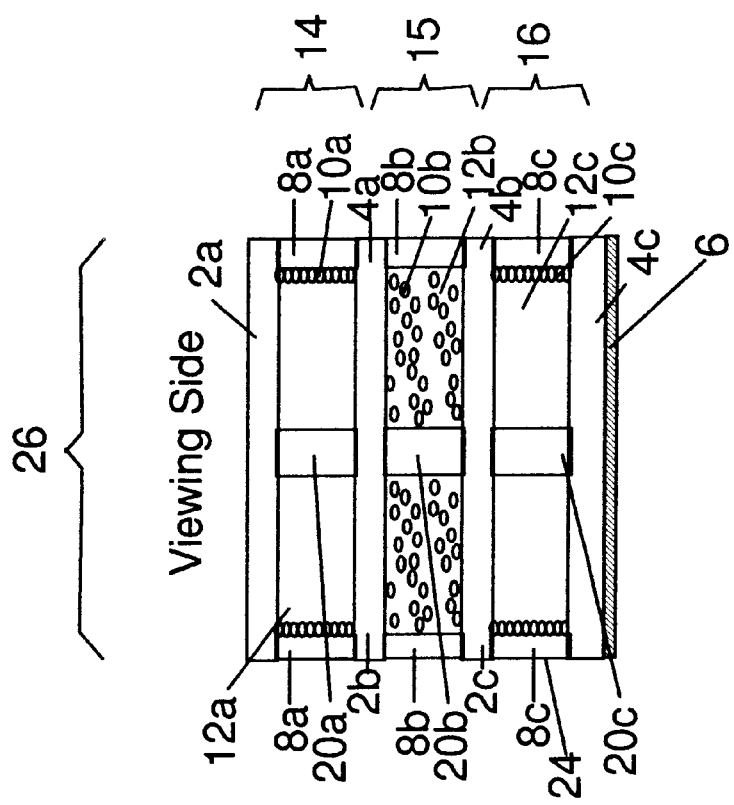
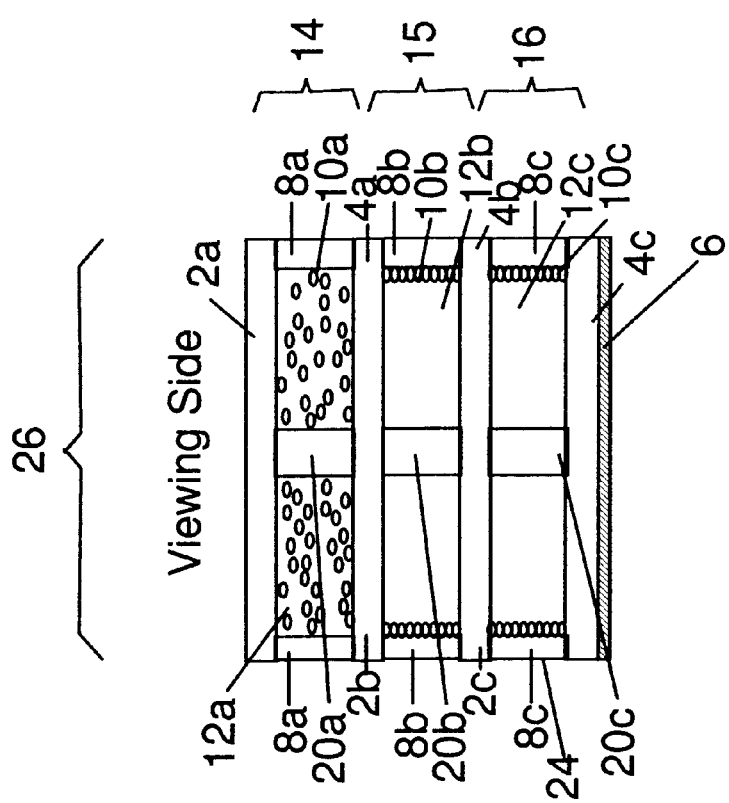

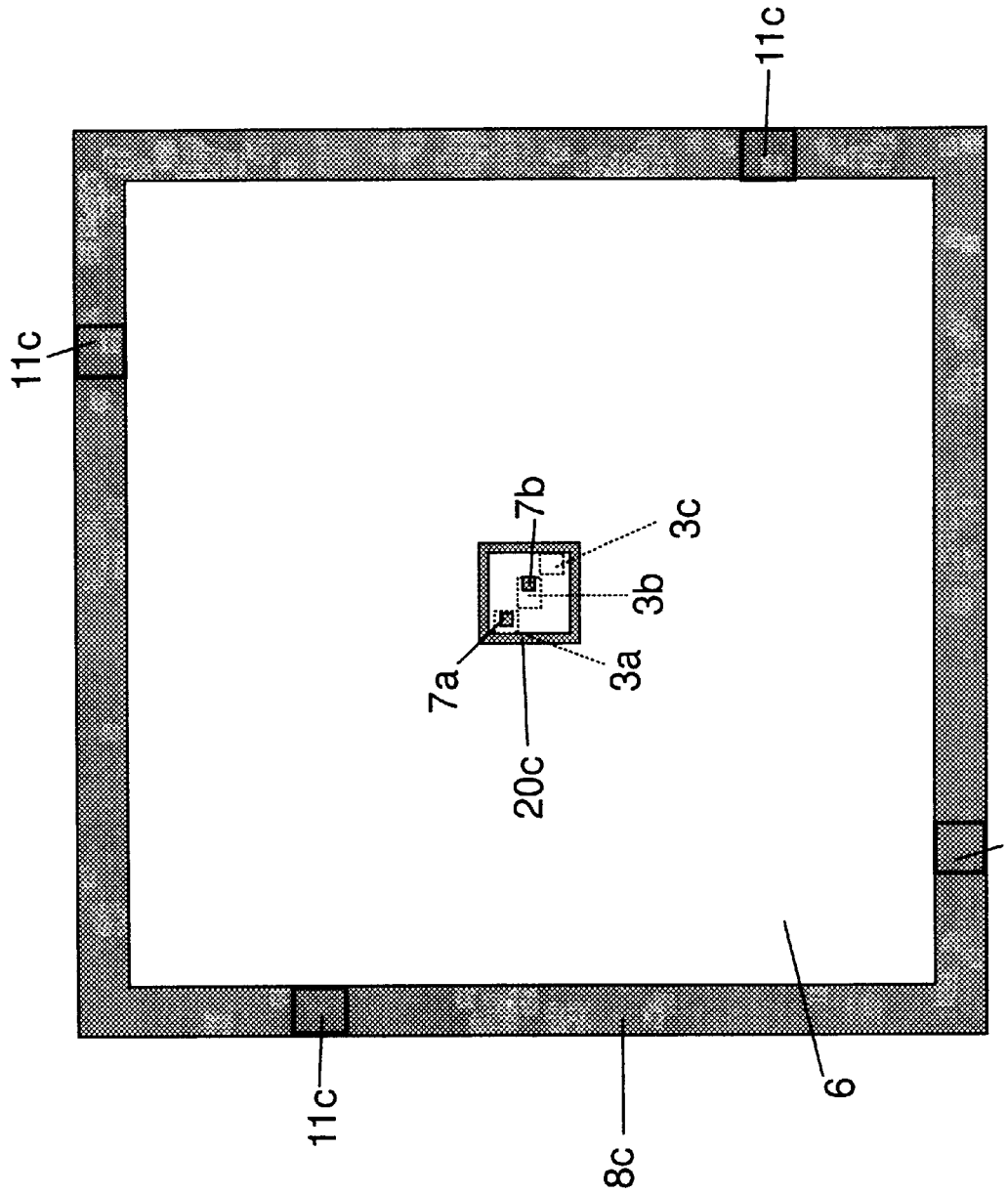

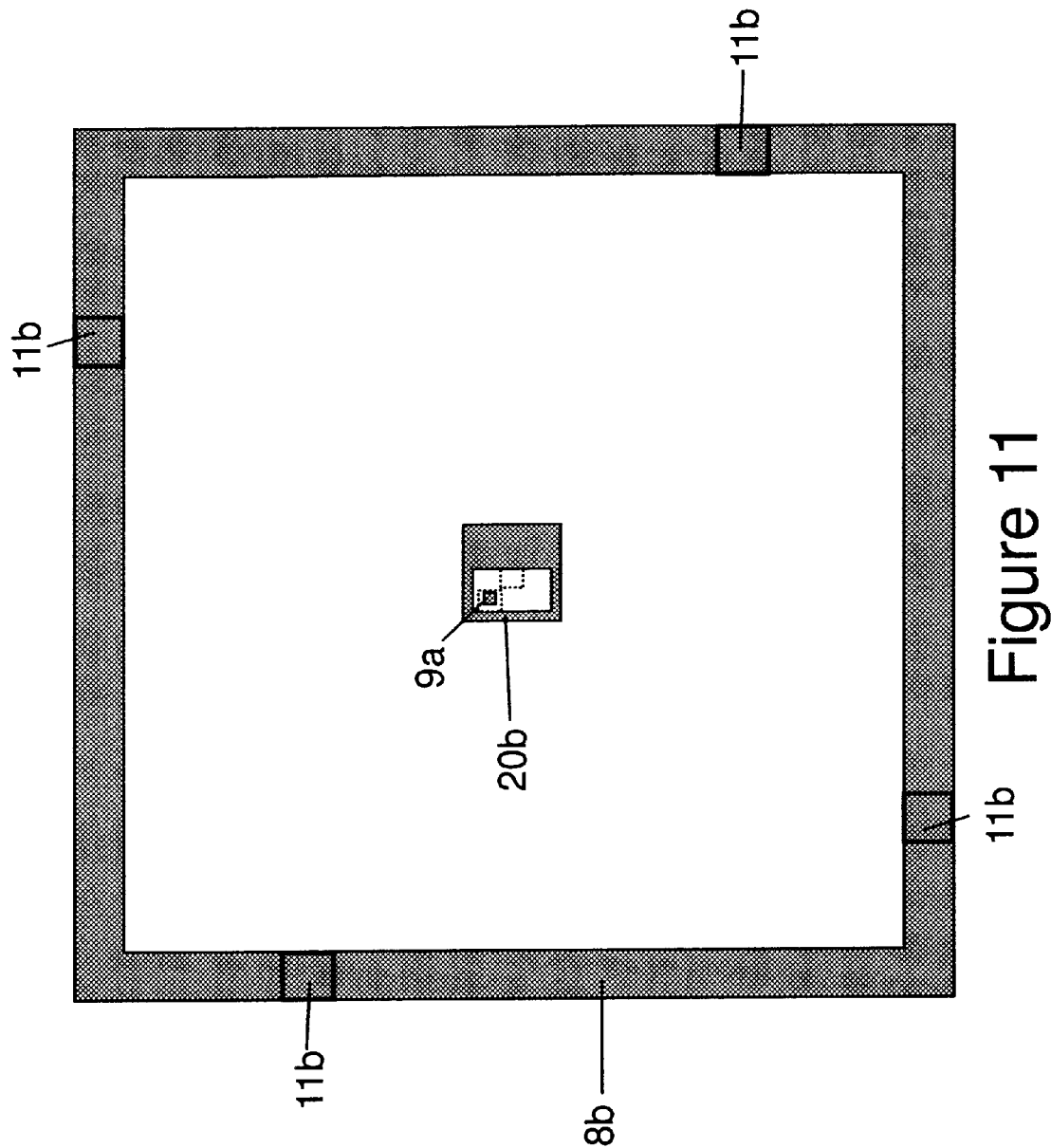

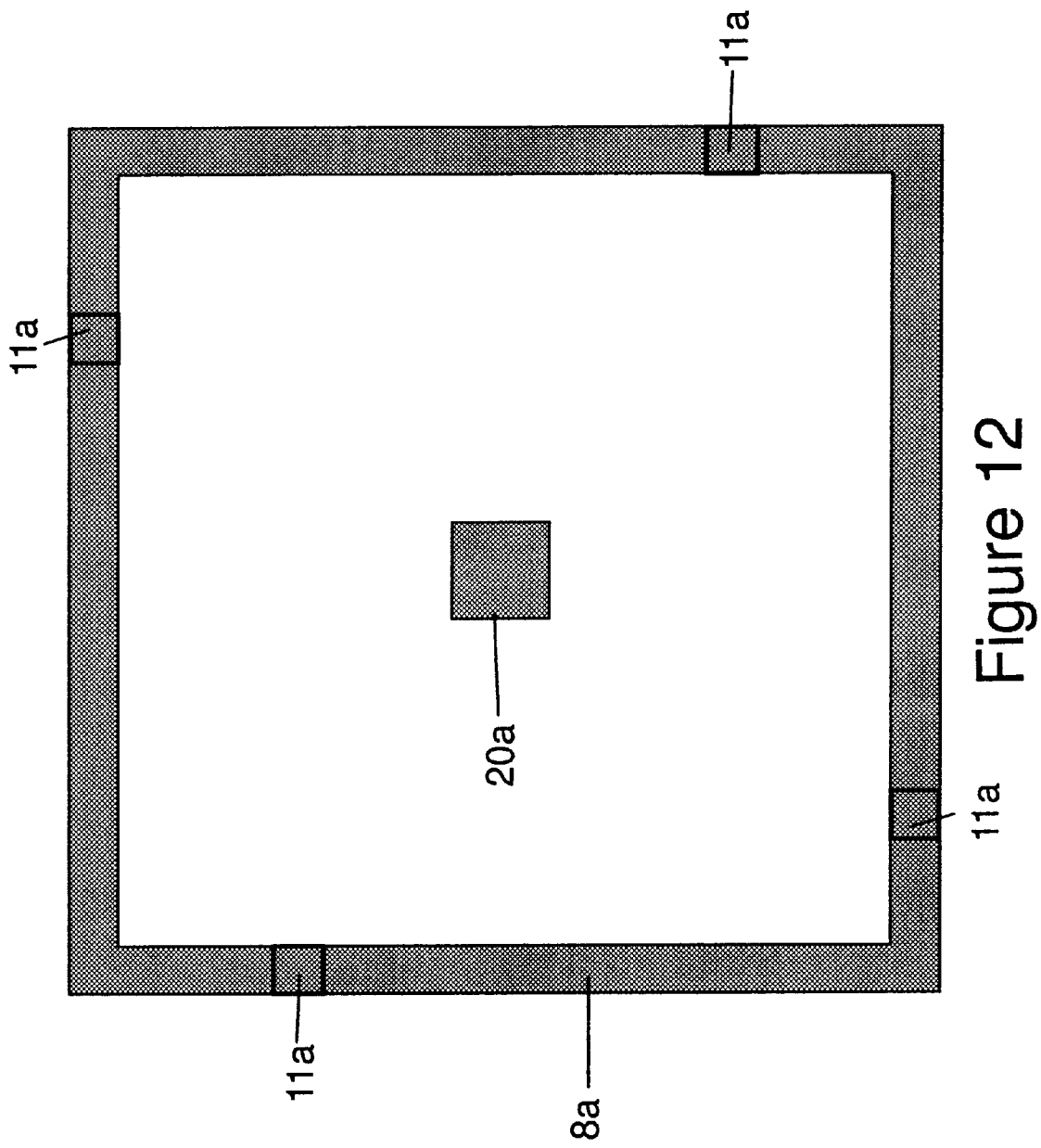

REFLECTIVE ELECTROPHORETIC DISPLAY WITH STACKED COLOR CELLS

RELATED APPLICATION

This application is related to concurrently filed application titled "Transmissive Electrophoretic Display With Stacked Color Cells". U.S. application Ser. No. 09/860,265 filed on May 18, 2001.

TECHNICAL FIELD

The present invention relates to electrophoretic cells that form an electrophoretic display. In particular the invention relates to a stacked cell configuration for use in a color electrophoretic display operating in a light-reflective mode.

BACKGROUND OF THE INVENTION

An electrophoretic cell is a cell comprised of pigment particles suspended in a fluid and uses electrophoresis to switch between the following two states:

Distributed State: Particles are positioned to cover the horizontal area of the cell. This can be accomplished, for example, by dispersing the particles throughout the cell, by forcing the particles to form a layer on the horizontal surfaces of the cell, or by some combination of both.

Collected State: Particles are positioned to minimize their coverage of the horizontal area of the cell, thus allowing light to be transmitted through the cell. This can be accomplished, for example, by compacting the particles in a horizontal area that is much smaller than the horizontal area of the cell, by forcing the particles to form a layer on the vertical surfaces of the cell, or by some combination of both.

The electrophoretic cell can serve as a light valve since the distributed and collected states can be made to have different light absorbing and/or light scattering characteristics. As a result, an electrophoretic cell can be placed in the light path between a light source and a viewer and can be used to regulate the appearance of a picture element or "pixel" in a display. The basic operation of reflective electrophoretic cells along with the examples of various electrode arrangements are described in IBM's U.S. Pat. Nos. 5,745,094 and 5,875,552.

Reflective color displays are known that use liquid crystals in conjunction with a fixed polarizer element to control the intensity of light reflected form each pixel. Since polarizers absorb the fraction of light whose polarization is not aligned with their active axis, and since this absorption varies with the angle of incidence, displays based on their use suffer from both limited reflectivity and viewing angle.

Other reflective color displays are known that use a solution of a dichroic dye in single or multiple layers of either a nematic or cholesteric liquid crystal material. Using a single nematic layers requires the use of a fixed polarizer element and therefore suffers from the aforementioned limitations. Using one or more cholesteric layers, or more than one nematic layer, eliminates the need for a fixed polarizer element and increases the achievable reflectivity. This approach still relies on the selective absorption of polarized light and, as a result, the contrast changes with viewing angle.

Other reflective color displays are known that use scattering liquid crystal materials, such as polymer-dispersed liquid crystal materials or scattering-mode polymer stabilized cholesteric texture materials, to control the intensity of light reflected from each pixel by switching between a turbid state and a uniform state. Since these materials only weakly scatter light in their turbid state, reflective displays based on them have a low diffuse reflectance and therefore also suffer from low brightness.

Other reflective color displays are known that use reflecting liquid crystal materials, such as reflective-mode polymer-stabilized cholesteric texture materials or holographic-polymer-dispersed liquid crystals, to control both the intensity and color or reflected light reflected from each pixel via diffraction effects. Since these depend on diffraction effects, it is difficult to simultaneously achieve large viewing angle, high reflectance, and angle independent color.

Liquid crystal displays commonly use a side-by-side arrangement of single color subpixels within each pixel to generate color via spatial color synthesis. The reflection efficiency of such an arrangement is limited by the fact that each subpixel only occupies a fraction of the total pixel area. By arranging the subpixels in a vertical stack, each subpixel can occupy the same lateral area as the pixel itself, and the reflection efficiency can be significantly increased. U.S. Pat. No. 5,625,474 assigned to the Sharp Corporation and IBM's U.S. Pat. No. 5,801,796 describe embodiments of stacked cell arrangements suitable for liquid crystal materials. Since these embodiments rely on liquid crystal materials, however, they remain hindered by the aforementioned limitations of such materials. Electrophoretic displays do not suffer from these limitations and can offer improved reflection characteristics combined with extremely low power requirements.

Reflective color electrophoretic displays have been proposed in the prior art. Japanese Patent JP 1267525 assigned to Toyota Motor Corporation describes an electrophoretic display having colored (blue and yellow) particles with different zeta potentials in a solution of red dye to give a multicolored (yellow, green and red) display. When a certain voltage is applied to the pixels, the yellow particles are pulled to the front transparent electrode and the viewer sees yellow. At a higher voltage, the blue particles are also pulled to the front electrode and the viewer sees green. When the particles are pulled off the transparent electrode, the colors of the particles are hidden by the dye solution and the viewer sees red.

U.S. Pat. No. 3,612,758 assigned to Xerox Corporation describes a reflective electrophoretic display having pigment particles of a single color in a contrasting dye solution. In this scheme, under the influence of an electric field, the particles migrate to a front transparent electrode and the viewer sees the color of the particles. When the field is reversed, the particles migrate away from the front transparent electrode, are hidden in the dye solution, and the viewer sees the color of the dye solution.

In the two electrophoretic display patents above, color contrast and reflectance depend on the presence or absence or particles at the front window. Since the dye solution can not be completely removed from the space between the particles when they are at the front window, displays based on this approach do not produce high contrasted images and generally have a low reflectance.

WO 94/28202 assigned to Copytele Inc. describes a dispersion for a reflective electrophoretic display comprised of two differently colored particles that are oppositely charged. The polarity of the voltage applied to the cell determines the polarity of the particle attracted to the front transparent electrode, and hence determines the color seen by the viewer. Since the viewer sees either one of two colors, this approach produces monochrome images and therefore has a limited color gamut.

U.S. Pat. No. 5,276,438 assigned to Copytele Inc. describes a reflective electrophoretic display in which a mesh screen, disposed behind the front window and covering the viewing area of the display, is used either with or without a dyed suspension fluid to hide particles of a single color from the viewer. When the particles are positioned in front of the mesh, the viewer sees the color of the particles. When the particles are positioned behind the mesh, the viewer sees a mixture of the mesh and particle colors. As a result, the contrast produced by this approach is limited by the open area of the mesh. In addition, this approach produces monochrome images and therefore has a limited color gamut.

U.S. Pat. No. 3,668,106 assigned to Matsushita Electric describes reflective electrophoretic displays using white or colored electrophoretic particles in colored or transparent suspension media in a side-by-side arrangement of colored subpixels to generate color via spatial color synthesis. IBM's U.S. Pat. No. 6,225,971 and pending application 09/154,284 also describe reflective electrophoretic displays that rely on spatial color synthesis, but which have improved reflectivity and color gamut. As stated above, however, the reflection efficiency of color generation via spatial color synthesis is limited by the fact that each subpixel only occupies a fraction of the total pixel area.

There is a continuing need in the art for a low-power reflective color display with high reflectance, high image contrast, and large color gamut. It would be desirable, therefore, to incorporate the advantages offered by electrophoresis in a scheme that can utilize vertically stacked subpixels to maximize reflection efficiency. Electrophoretic displays that rely on hiding particles in a dye or behind a mesh are not suitable for stacking, since their reflectivity and contrast originate from the need to prevent light from passing through both the particles and the hiding medium. Furthermore, stacked cell structures suitable for liquid crystal materials are not appropriate for stackable electrophoretic schemes. In particular, the lateral parallel-plate electrode geometries used in both stacked and non-stacked liquid crystal displays are not capable of switching an electrophoretic suspension between its distributed and collected states. In addition, since electrophoretic suspensions can be influenced by weak electric fields, such geometries do not provide sufficient isolation of any given subpixel from the stray electric fields that originate from its neighbors.

SUMMARY OF THE INVENTION

The present invention is a reflective color electrophoretic display. The display is intended to be viewed while illuminated from the front window by ambient light and to operate without the need of a backlight. The display is comprised of many picture elements or pixels located in lateral adjacency in a plane. Each pixel is comprised of two or more subpixels, or cells, which are vertically stacked, one directly above the other on a reflective panel located at the rear or bottom of the stacks. The cells contain a light-transmissive fluid and charged pigment particles that can absorb a portion of the visible spectrum, with each cell in a stack containing particles having a color different from the colors of the particles in the other cells in the stack. The color of a pixel is determined by the portion of the visible spectrum that survives the cumulative effect of traversing each cell in the stack and reflecting off the reflective panel. Each cell is comprised of light-transmissive front and rear windows, at least one non-obstructing counter electrode, and at least one non-obstructing collecting electrode. A plurality of vertical side walls extend from the rear panel and support the windows in a spaced apart relationship. The side walls are vertically aligned with one another and thus divide the display into a plurality of vertical stacks of cells, each stack forming a pixel. The electrodes are controlled by solid state switches or driving elements, such as a thin film transistor or a metal-insulator-metal device, formed on the inside surface of the rear panel, with electrical connection being made vertically through holes in the windows that separate the cells in the stacks.

The amount and color of the light reflected by each cell is controlled by the position and the color of the pigment particles within the cell. The position, in turn, is directed by the application of appropriate voltages to the collecting and counter electrodes. When the pigment particles are positioned in the path of the light that enters the cell, the particles absorb a selected portion of this light and the remaining light is transmitted through the cell. When the pigment particles are substantially removed from the path of the light entering the cell, the light can pass through the cell, reflect from the reflective panel, pass through the cell again, and emerge without significant visible change. The light seen by the viewer, therefore, depends on the distribution of particles in each of the cells in the vertical stacks. Since each of the cells or subpixels in the stack occupy the same lateral area as the pixel itself, the reflection efficiency can be significantly higher than that of embodiments that rely on a side-by-side arrangement of subpixels to generate color.

A more thorough disclosure of the present invention is presented in the detailed description that follows and from the accompanying figures.

BRIEF DESCRIPTION OF THE DRAWING

FIGS. 3–8 are side sectional views of one pixel of the display of the present invention showing the three stacked cells with the electrophoretic pigment particles in particular cells being in either the collected or distributed state, to thereby illustrate the manner in which the pixel achieves different colors.

FIGS. 10–12 are top views of the pixel illustrating steps in the fabrication of the cells in the stack.

DETAILED DESCRIPTION OF THE INVENTION

Figure 2:
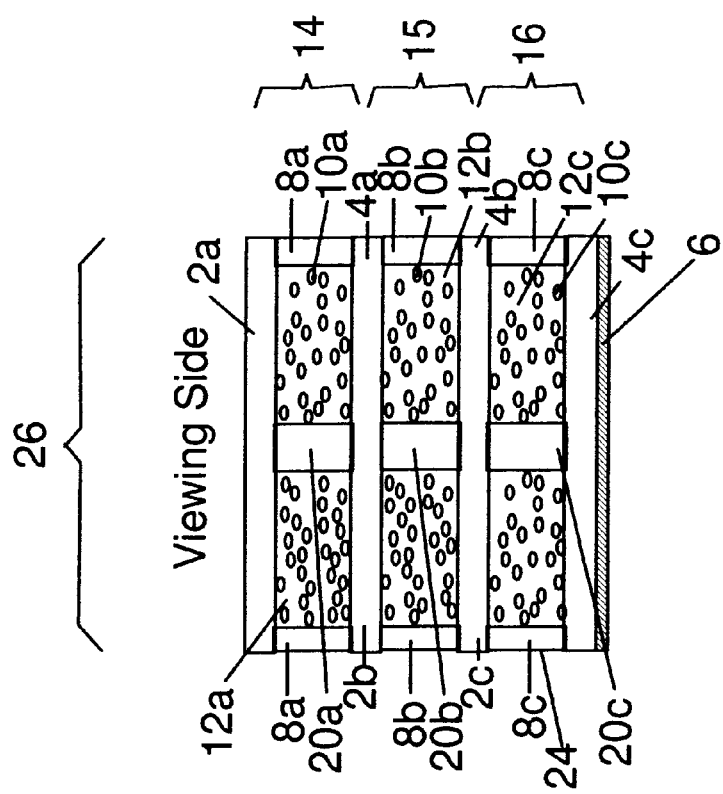
FIG. 2 is a side sectional view of one pixel of the display of the present invention, illustrating the three stacked cells with the electrophoretic pigment particles in all the cells in the distributed state.

The suspension used in the electrophoretic display of the present invention is minimally comprised of pigment particles and a light-transmissive fluid. The suspension is preferably highly stable with both time and use. The suspension is preferably highly resistant to agglomeration, flocculation, and sticking to the surfaces in the cell, even after being compacted and re-dispersed many times. The suspension preferably doesn't react with the surfaces in the cell. The specific gravity of the pigment particles and the fluid are preferably similar. The pigment particles preferably acquire a single polarity when placed in suspension.

Optionally, other components may be added to the suspension such as charge control additives, dispersants, and surfactants to improve the performance of the suspension. Suitable additives include sodium dioctylsulfosuccinate, zirconium octoate, and metal soaps such as lecithan, barium petronate, calcium petronate, alkyl succinimide, iron naphthenate, and polyethylene glycol sorbitan stearate.

The suspension fluid is preferably colorless. The fluid preferably has minimum solvent action on the pigments and does not react with the surfaces in the cell. The fluid is preferably dielectric and substantially free of ions. The fluid preferably has a low viscosity. The fluid can be a mixture of fluids. Suitable fluids include silicone fluids such as hexamethyldisiloxane, octamethyltrisiloxane, decamethyltetrasiloxane, and other poly(dimethylsiloxane)s. Suitable fluids also include hydrocarbons such as decane, dodecane, tetradecane, xylene, Sohio odorless solvent (a kerosene fraction available from Exxon Company), toluene, hexane and Isopar® C, E, G, H, K, L, M, and V and Norpar® 12, 13, and 15 (branched and linear saturated aliphatic hydrocarbons available from Exxon Company).

The pigment particles can be black, white (reflective) or colored. Suitable colors include cyan, magenta, yellow, red, green, blue, or the like. Suitable classes of inorganic pigments include:

Cadmium Red
Cadmium sulfo-selenide (black)
Carbon Black
Chromium oxide (green)
Iron oxides (black)
Iron oxides (red)
Lead chromate (yellow)
Manganese dioxide (brown)
Silicon monoxide (reddish brown)
Sulfur (yellow)
Vermilion Red Suitable classes of organic pigments include:

Anthracene (fluorescent blue, fluorescent yellow)
Anthraquinone (blue, red, yellow)
Azonaphthols (magenta)
Azopyridone (yellow)
Heterocyclic Azo (cyan, magenta)
Methine (yellow)
Nigrosines (black)
Phthalocyanine (blue, green, cyan)
Quinacridone (magenta)

Suitable opaque pigment particles include:

Anric Brown (C.I. Pigment Brown 6)
Cabot Mogul L (black)
C.I. Direct Yellow 86
C.I. Direct Blue 199 (cyan)
C.I. Food Black 2
Dalama® Yellow (Pigment Yellow 74)
Hansa® Yellow (Pigment Yellow 98)
Indo® Brilliant Scarlet (Pigment Red 123)
Monastral® Green G (C.I. Pigment Green 7)
Monastral® Blue B (C.I. Pigment Blue 15)
Monastral® Blue G (C.I. Pigment Blue 15)
Monastral® Green B (C.I. Pigment Green 7)
Paliotol® Black L0080 (C.I. Pigment Black 1)
Permanent Rubine F6BI3-1731 (Pigment Red 184)
Pigment Scarlet (C.I. Pigment Red 60)
Quindo® Magenta (Pigment Red 122)
Stirling NS N 77Y (Pigment Black 7)
Toluidine Red B (C.I. Pigment Red 3)
Toluidine Red Y (C.I. Pigment Red 3)
Toluidine Yellow G (C.I. Pigment Yellow)
Watchung® Red B (C.I. Pigment Red 48)

Other suitable pigment particles will be known to those skilled in the art, such as those described in U.S. Pat. Nos. 5,200,289 and 4,631,244 relating to liquid toners for electrophotography, and in IBM's U.S. Pat. No. 5,914,806 for stable electrophoretic particles.

The light-reflective panel located at the rear or bottom of the stacks can be colored or colorless provided it reflects the colors of light transmitted by the particles. The panel can be mirrored to reflect all visible wavelengths (e.g. coated with aluminum, chromium, or silver), or mirrored to reflect selected visible wavelengths (e.g. coated with a dielectric stack). Alternatively, the panel can be pigmented white or can be colored with either a pigment or a dye. The reflected light is preferably diffused either by the reflective panel itself or by a separate element. Alternatively, the panel can be replaced by electrophoretic cells containing reflecting particles.

The collecting and counter electrodes in each cell are constituted or sized or positioned to be non-obstructing. This means that in the collected state, neither the particle coated collecting electrode nor the counter electrode unacceptably interferes with the passage of the desired color of light as it travels through the cell, i.e. substantially all of the incident light of the desired color is passed through the cell.

A non-obstructing collecting electrode can be realized by allowing it to occupy only a small fraction of the horizontal area of the cell by, for example, forming it into a narrow line or a small pedestal. It can also be realized by disposing it along a vertical wall in the cell. A non-obstructing counter electrode can be realized similarly or, alternatively, by coating the inside surface of the front window or the rear panel with a layer of conductive, light-transmissive material such as indium tin oxide. Alternatively, a rear panel with a light reflecting metallic surface can also serve as the counter electrode on the bottom-most cell as well as the reflecting surface.

There can be one or more non-obstructing collecting electrodes and one or more non-obstructing counter electrodes in each cell and either electrode can be common to more than one cell. They can be disposed vertically and/or horizontally in the cell. The electrodes are preferably good conductors (e.g. aluminum, chromium, copper, nickel) and can be light-transmissive (e.g. indium tin oxide). They can be formed entirely of metal or as an electrically conducting film deposited on the appropriate portion of a nonconductive surface. The various electrode arrangements for electrophoretic cells described in IBM's U.S. Pat. Nos. 5,872,552 and 6,144,361, which are incorporated herein by reference, will function in the stacked color electrophoretic display of the present invention.

The following examples are detailed descriptions of displays of the present invention. The details fall within the scope of, and serve to exemplify, the more general description set forth above. The examples are presented for illustrative purposes only, and are not intended as a restriction on the scope of the invention.

FIGS. 1 through 8 illustrate a preferred embodiment of electrophoretic display cells in accordance with the present invention. Each cell 14, 15, and 16 generally comprises a front light{-}transmissive and rear light-transmissive window. The front light-transmissive window 2a of cell 14 and the rear light-transmissive window 4c of cell 16 also serve as the top and bottom surface of the pixel 26. The front window 2b of cell 15 is a thin light-transmissive plate that preferably also serves as the rear window 4a of cell 14 and vice versa. Likewise, the front window 2c of cell 16 is a thin light-transmissive plate that preferably also serves as the rear window 4b of cell 15 and vice versa. The rear window 4c of the bottom-most cell is backed by a reflective layer 6. Preferably rear window 4c is glass with a reflective layer 6 deposited on its outer surface, and thus window 4c serves as a light-reflective rear panel for the display.

Each cell 14, 15, and 16 has one or more non-obstructing counter post electrodes 20a, 20b, and 20c and collecting wall electrodes 8a, 8b, and 8c disposed within the cell. Each cell 14, 15, and 16 also has a suspension comprised of charged pigment particles 10a, 10b, and 10c respectively, in light-transmissive fluids 12a, 12b, and 12c respectively, in the space between its respective front and rear windows, 2a and 4a, 2b and 4b, and 2c and 4c. The vertically stacked cells 14, 15, and 16 form a reflective electrophoretic color pixel 26. Only one pixel is illustrated, but the display comprises a large plurality of laterally adjacent pixels, with adjacent pixels sharing side walls. The side walls 8a, 8b, 8c, which also serve as the collecting electrodes, support the plates and windows in a spaced-apart relationship. The side walls 8a, 8b, 8c are vertically aligned above the horizontal surface of rear window 4c, and thus divide the display into the plurality of individual color pixels 26. Each cell in a stack also has laterally adjacent like cells which together form a layer of cells in the display. In the preferred embodiment all the cells in a layer have pigment particles of the same color.

The counter electrodes 20a, 20b, and 20c represent individually addressable posts. The electrical connection to these posts may be made via vertical wires through the appropriate underlying windows and cells. The horizontal area occupied by a post is much smaller than the horizontal area of the cell. The collecting electrodes 8a, 8b, and 8c also serve as the thin vertical side walls oriented perpendicularly to both the front window 2a, the thin plates that serve as windows 2b and 2c, and the rear panel with window 4c, respectively. The counter and collecting electrodes can be formed entirely of electrically conductive metal, such as by electrodeposition into a pattern formed in a layer of photoresist, followed by removal of the photoresist. The collecting electrodes 8a, 8b, 8c may also be formed as electrically conductive films deposited on the cell-interior surfaces of the nonconductive side walls. The four vertical side walls define the perimeter of each cell 14, 15, and 16. Laterally or horizontally adjacent pixels share a wall. The side walls that surround each cell form a common structure that is held at the same voltage. The horizontal area occupied by the side walls is preferably much smaller than the viewing area of the display.

Figure 1:
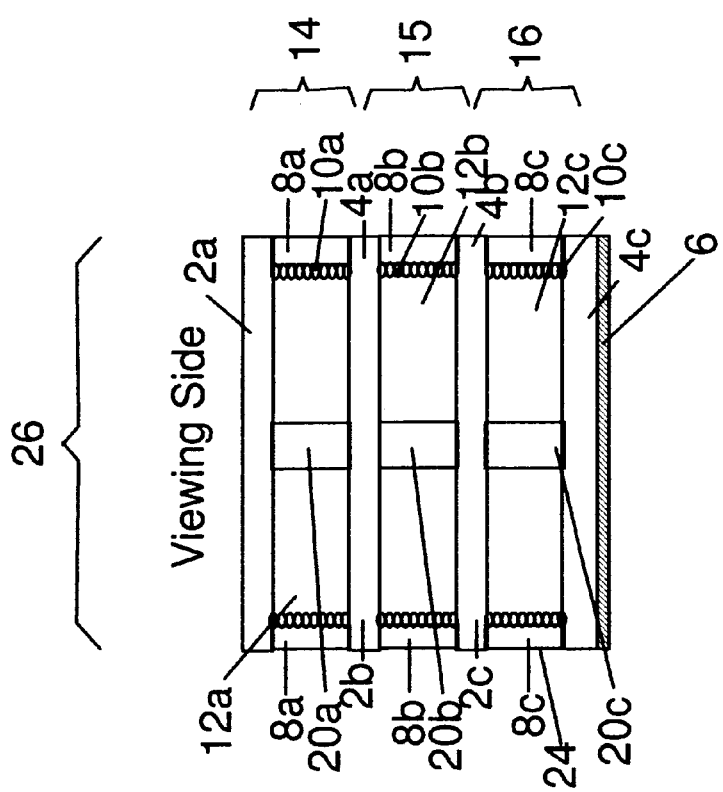
FIG. 1 is a side sectional view of one pixel of the display of the present invention, illustrating the three stacked cells with the electrophoretic pigment particles in all the cells in the collected state.

By appropriately changing the voltage applied to the addressable center post electrodes 20a, 20b, and 20c, the cells can be switched between their collected and distributed states. The collected state of the cells 14, 15, and 16 are illustrated as one in which the particles have accumulated on their respective collecting electrodes 8a, 8b, and 8c. FIG. 1, for example, shows the three cells 14, 15, and 16 in their collected state. In their collected state, the particles form a thin layer on a vertically disposed surface and therefore occupy substantially no horizontal area within a cell. Since the collection area of the collection electrode is large, i.e., the entire interior surface of the perimeter walls, the particles are not forced into a small, highly compacted volume. The distributed state of a cell is illustrated as one in which the respective particles 10a, 10b, and 10c are generally uniformly dispersed throughout their respective suspension fluids 12a, 12b, and 12c. FIG. 2, for example, shows the three cells 14, 15, and 16 in their distributed state. In their distributed state, the particles are disbursed substantially over the entire horizontal area of a cell.

The color of a pixel is determined by the state of, and particle color associated with, each cell in its vertical stack. FIGS. 1 through 8 illustrate a preferred embodiment that utilizes particles with subtractive primary colors. The particles 10a in cell 14 are yellow, the particles 10b in cell 15 are cyan, the particles 10c in cell 16 are magenta, and the color of the reflective panel 6 is white.

In FIG. 1, the cells 14, 15, and 16 are each in their collected state. Since the particles 10a, 10b, and 10c occupy substantially no horizontal area in their respective cells, light can pass through each of the cells without significantly interacting with their respective particles. Ambient light, therefore, will pass through the light-transmissive front and rear windows of each cell without significant visible change, reflect off the reflective panel 6, and then pass back through the light-transmissive rear and front windows of each cell without significant visible change. As a result, the pixel 26 in FIG. 1 will appear white to the viewer.

In FIG. 2, the cells 14, 15, and 16 are each in their distributed state. Since the particles 10a, 10b, and 10c substantially cover the entire horizontal area in their respective cells, light passing through these cells significantly interacts with the particles in each cell. Ambient light illuminating the cell stack interacts first with the yellow particles 10a in cell 14, then with the cyan particles 10b in cell 15, then with the magenta particles 10c in cell 16 before reflecting off the reflecting panel 6, followed by a second interaction with the magenta particles 10c in cell 16, then with the cyan particles 10b in cell 15, and finally with the yellow particles 10a in cell 14. As a result of interacting with all three sets of particles, each possessing a different subtractive primary color, significantly all the ambient visible light is absorbed in the vertical cell stack and the pixel 26 in FIG. 2 will appear dark or black to the viewer.

Figure 3:
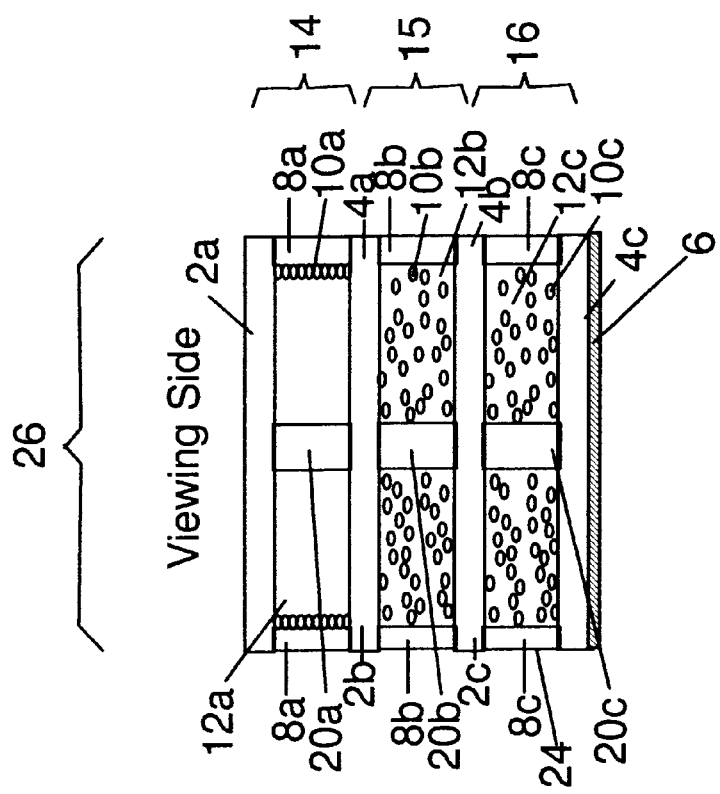

In FIG. 3, cell 16 is in its collected state, while cells 14 and 15 are each in their distributed state. Since the particles 10c occupy substantially no horizontal area in cell 16, light can pass through this cell without significantly interacting with its particles. Since the particles 10a and 10b substantially cover the entire horizontal area in their respective cells, light passing through these cells significantly interacts with the particles in each cell. Ambient light will therefore pass through cell 16 without significant visible change but will interact with the yellow particles 10a in cell 14 and with the cyan particles 10b in cell 15. As a result of interacting with the yellow and cyan particles, light reflecting from the pixel 26 in FIG. 3 will appear green to the viewer.

Figure 4:
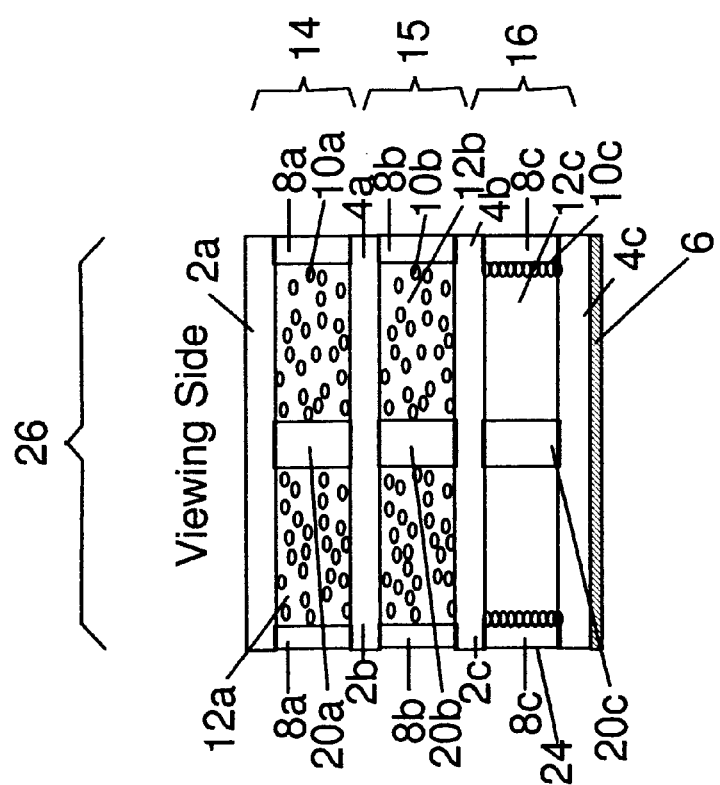

A similar situation is illustrated in FIGS. 4 and 5. In FIG. 4, cell 14 is in its collected state while cells 15 and 16 are in their distributed state. Ambient light will pass through cell 14 without significant change but will interact with the cyan particles 10b in cell 15 and with the magenta particles 10c in cell 16. As a result of interacting with the cyan and magenta particles, light reflecting from the pixel 26 in FIG. 4 will appear blue to the viewer. In FIG. 5, cell 15 is in its collected state while cells 14 and 16 are in their distributed state. Ambient light will pass through cell 14 without significant visible change but will interact with the yellow particles 10a in cell 14 and with the magenta particles 10c in cell 16. As a result of interacting with the yellow and magenta particles, light reflecting from the pixel 26 in FIG. 5 will appear red to the viewer.

Therefore, by selecting the appropriate combination of two cells in a distributed state with one cell in a collected state, the pixel 26 can generate any one of the three primary colors. By selecting combinations complementary to these, that is, two cells in a collected state with one cell in a distributed state, the pixel 26 can generate any one of the three subtractive primary colors. This is illustrated in FIGS. 6 through 8.

In FIG. 6, cell 16 is in its distributed state, while cells 14 and 15 are both in their collected state. Ambient light passes through cells 14 and 15 without significant visible change but interacts with the magenta particles 10c in cell 16. As a result of interacting only with the magenta particles, light reflecting from the pixel 26 in FIG. 6 will appear magenta to the viewer. In FIG. 7, cell 14 is in its distributed state while cells 15 and 16 are in their collected state. Ambient light passes through cells 15 and 16 without significant visible change but interacts with the yellow particles 10a in cell 14. Light reflecting from the pixel 26 in FIG. 7, therefore, will appear yellow to the viewer. In FIG. 8, cell 15 is in its distributed state, while cells 14 and 16 are in their collected state. Ambient light passes through cells 14 and 16 without significant visible change but interacts with the cyan particles 10b in cell 15. As a result, light reflecting from the pixel 26 in FIG. 8 will appear cyan to the viewer.

Figure 9:
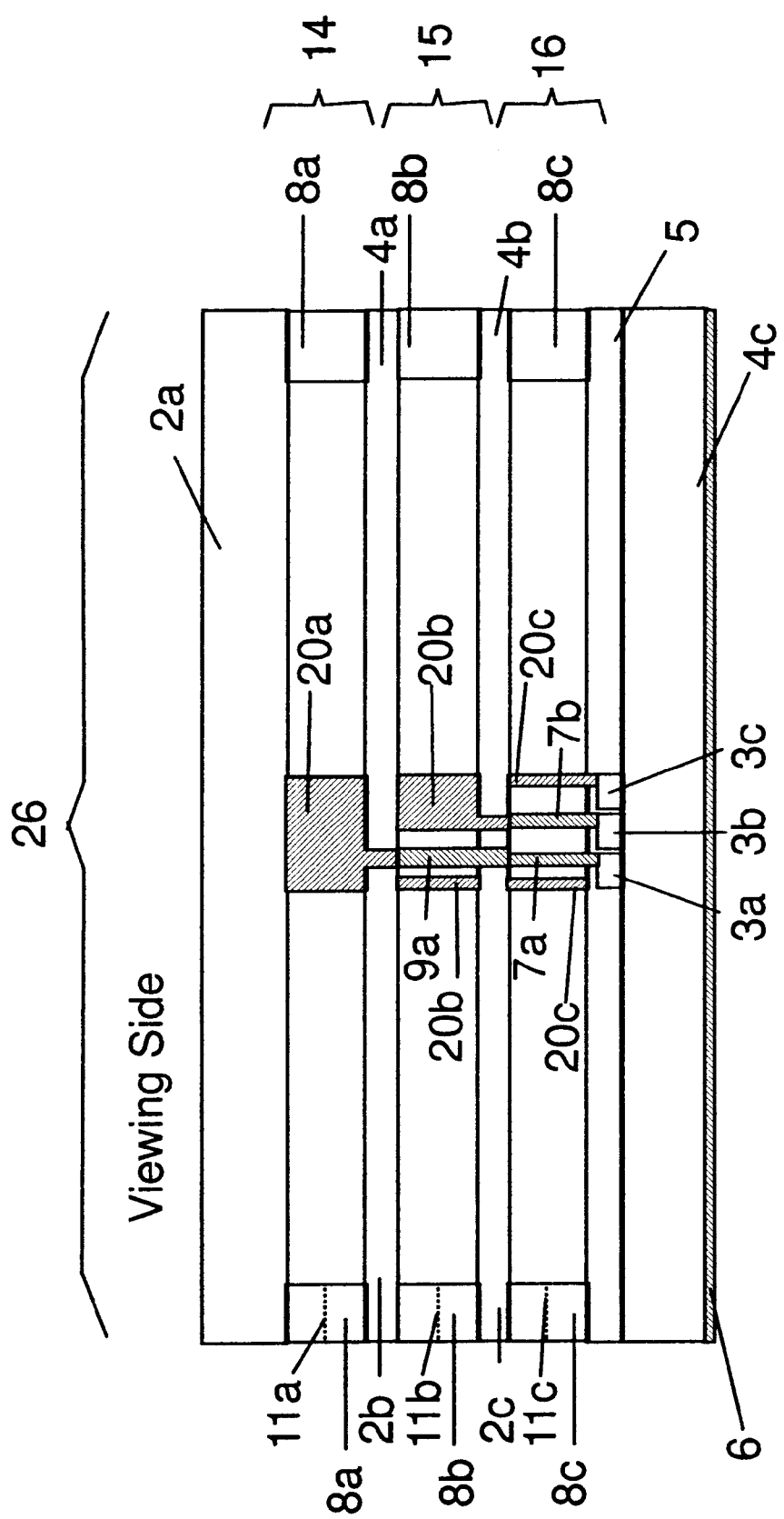
FIG. 9 is a side sectional view of one pixel of the display of the present invention illustrating the collecting and counter electrodes and the electrical connection from the electrode driving elements to the electrodes.

The process of constructing a preferred embodiment of the stacked electrophoretic display of the present invention can be followed by reference to FIG. 9, a sectional view illustrating the structure of a single pixel 26 in a reflective electrophoretic display device with three stacked color cells.

Each pixel 26 has three separate solid state switches or driving elements 3a, 3b, and 3c, each of which is preferably a thin film transistor or a metal-insulator-metal device, formed on the top surface of rear window 4c of cell 16 near the lateral center of the pixel 26. Driving element 3a is used to operate post electrode 20a in cell 14, driving element 3b is used to operate post electrode 20b in cell 15, and driving element 3c is used to operate post electrode 20c in cell 16. The driving elements 3a, 3b, and 3c and their associated connections preferably occupy a small fraction of the total lateral area on the top surface of the rear window 4c of cell 16.

A white reflective layer 6 covers the bottom surface of the rear window 4c of cell 16. The white color can be achieved by using a metallic layer such as aluminum or chromium in conjunction with a light-diffusing over layer, or can be achieved by using a layer of properly-sized high refractive index particles properly suspended in a low refractive index medium, i.e. white paint. A transparent insulating film 5, such as of $SiO_2$, covers the top surface of the rear window 4c of cell 16, including the driving elements 3a, 3b, and 3c and their associated connections. To make electrical contact between the driving elements and their respective electrodes, common lithographic and etching techniques can be used to create properly aligned holes through the insulating film 5.

Standard lithographic, etching, and deposition techniques (for example as described in IBM's U.S. Pat. No. 6,144,361) can be used to create the wall electrode 8c, the vertical wires 7a and 7b that reside inside the post electrode 20c, and the post electrode 20c itself. The post electrode 20c is formed directly on the driving element 3c through its contact hole in the insulating layer 5. Vertical wires 7a and 7b are formed directly on the driving elements 3a and 3b respectively, and allow electrical signals originating from their respective driving elements to pass through cell 16 on their way to post electrodes 20a and 20b, respectively. Plates 2b, 2c have holes that permit the passage of electrical conductors from the driving elements on the surface of the rear panel to the counter electrodes in each of the cells. The holes may be filled with electrically conductive material that serve as the conductors connecting the vertical wires, as shown in FIG. 9, for example, for the ends of wire 9a that are in contact with the conductive material in the holes of windows 2b, 2c.

To facilitate filling of cell 16, a second lithographic/etching step may be performed to create at least one notch 11c on each side of the top surface of the wall electrode 8c. The top of cell 16 is formed by placing a thin transparent plate on the top surfaces of the wall electrode 8c, the post electrode 20c, and the vertical wires 7a and 7b. This plate acts as both the top surface 2c for cell 16 and the bottom surface 4b for cell 15. A top-down view of cell 16 at this stage of construction is illustrated in FIG. 10.

The next level of construction begins by using lithographic and etching techniques to create holes in the thin plate 2c/4b that expose and allow connection to the vertical wires 7a and 7b. Standard lithographic, etching, and deposition techniques can be used to create the wall electrode 8b, the vertical wire 9a that resides inside the post electrode 20b, and the post electrode 20b itself. The post electrode 20b is formed directly on the vertical wire 7b (that is connected to driving element 3b). Vertical wire 9a is formed directly on vertical wire 7a and allows electrical signals from vertical wire 7a (that originate from driving element 3a) to pass through cell 15 on their way to post electrode 20a.

To facilitate filling of cell 15, a second lithographic/etching step may be performed to create at least one notch 11b on each side of the top surface of the wall electrode 8b. The top of cell 15 is formed by placing a thin transparent plate on the top surfaces of the wall electrode 8b, the post electrode 20b, and the vertical wire 9a. This plate acts as both the top surface 2b for cell 15 and the bottom surface 4a for cell 14. A top-down view of cell 15 at this stage of construction is illustrated in FIG. 11.

The post electrodes 20c and 20b are hollow and thus have passages for electrical connectors, such as the wires 7a, 7b and 9a, which are nested within the electrodes 20c and 20b. Nesting wires 7a and 7b inside the hollow post electrode 20c, and nesting wire 9a inside the hollow post electrode 20b, permit electrical connection to upper post electrode 20a while the surrounding electrodes 20c and 20b shield the suspension in the lower cells from the electric field generated by the nesting wires 7a and 7b. In this way, the electrophoretic suspension in any upper cell can be switched between its collected and distributed states with reduced influence on the suspension associated with any cell below it.

The last level of construction begins by using lithographic and etching techniques to create the holes in the thin plate 2b/4a that expose and allow connection to the vertical wire 9a. Standard lithographic, etching, and deposition techniques can be used to create the wall electrode 8a and the post electrode 20a. Post electrode 20a is formed directly on vertical wire 9a, which is connected to vertical wire 7a, which in turn is connected to driving element 3a.

To facilitate filling of cell 14, a second lithographic/etching step may be performed to create at least one notch 11a on each side of the top surface of the wall electrode 8a. The top of cell 14 is formed by placing a thick transparent plate on the top surfaces of the wall electrode 8b and the post electrode 20b. This plate acts as both the top surface 2a for cell 15 and as the top surface for the pixel 26. A top-down view of cell 14 at this stage of construction is illustrated in FIG. 12.

The wall electrodes 8a, 8b, and 8c for every pixel 26 in the display are preferably held at a common voltage, which is preferably ground. To ensure that the three wall electrode structures (one associated with each of the three layers) are held at a common voltage, an electrical connection can be made between the outside edges of the outermost pixels of the display, across the thin transparent plates 2c/4b and 2b/4a. Alternatively, using standard lithographic, etching, and deposition techniques, an electrical connection between the three wall electrode structures could be formed through holes in the thin transparent plates 2c/4b and 2b/4a. Since this grounded electrode wall structure laterally surrounds the post electrode and the electrophoretic suspension in every subpixel, and since the wall structures in each layer are vertically aligned and in electrical contact, stray electric fields that can adversely influence the suspension in neighboring subpixels are substantially reduced.

The different layers in a pixel 26 possess suspensions with differently colored pigment particles, while all the cells in a given layer possess the same color of pigment particles. Suspensions with the desired colored particles can be introduced to each of the three layers by separately filling each layer via capillary and/or vacuum action through the notches 11a, 11b and 11c in the outside edges of the outermost pixels of the display. U.S. Pat. No. 5,279,511 assigned to Copytele Inc. describes an alternative process for filling a single cell in an electrophoretic display. Using this process, the three differently colored dry pigment particles 10c, 10b, and 10a are coated onto the bottom, middle, and top layers respectively, at the appropriate time during the construction of each layer. A common light-transmissive suspension fluid 12 can then be simultaneously introduced to all three layers via capillary and/or vacuum action through the notches 11 in the outside edges of the outermost pixels of the display.

Other embodiments of this invention can use different color combinations for the cells within the pixel, can use a different number of cells for each pixel, or can use selectively colored reflective panels. Even though it would reduce the color gamut, red, green, and blue particles, for example, could be used instead of cyan, magenta, and yellow particles. Reducing the number of cells in the vertical stack of the pixel from three to two would also reduce the color gamut, but could simplify the construction and/or operation of the device. Increasing the number of cells in the vertical stack could also be advantageous. Adding a fourth cell to the stack that contained black absorbing particles, for example, could enhance pixel blackness while in the distributed state and improve the contrast of the display. Even through it would reduce the color gamut, a colored reflective panel could be used in conjunction with white (scattering) particles in the bottom-most cell.

Other embodiments of this invention can also use a different number of collecting and/or counter electrodes, and their positions and/or shapes and/or sizes can be different from that described. The distributed state need not be one in which the particles are distributed throughout the volume of the cell, the particles could be forced to form a layer across one or more horizontal surfaces of the cell. In addition, some components in the illustrations above may not be necessary or could be modified in other embodiments.

Although this invention has been described with respect to specific embodiments, the details are not to be construed as limitations for it will be apparent that various embodiments, changes, and modifications may be resorted to without departing from the spirit and scope thereof. Further it is understood that such equivalent embodiments are intended to be included within the scope of this invention.

What is claimed is:

1. A color electrophoretic display comprising:
   a substantially planar light-reflective rear panel;
   a substantially planar light-transmissive front window generally parallel to and spaced from the rear panel;
   a plurality of pixels laterally adjacent to one another and located in the space between the rear panel and the front window, each pixel comprising multiple cells stacked from the rear panel to the front window, each cell in the stack containing charged, light-absorbing pigment particles in a light-transmissive fluid, and all laterally adjacent cells from different pixels forming layers of cells with each layer having pigment particles of the same color;
   a collecting electrode substantially non-obstructing to light and associated with each cell to substantially remove pigment particles in the associated cell from the path of light through the cell; and
   a counter electrode substantially non-obstructing to light and associated with each collecting electrode to distribute the pigment particles throughout the light-transmissive fluid of the associated cell so as to be in the path of light through the cell.

2. An electrophoretic display as claimed in claim 1 further comprising a first light-transmissive plate generally parallel to the rear panel and separating the cells in the layer nearest the rear panel from cells in the neighboring layer, and wherein the first plate includes a plurality of holes, each hole associated with a cell, for permitting electrical connection from the rear panel to the electrodes in the cells in said neighboring layer.

3. An electrophoretic display as claimed in claim 2 further comprising side walls substantially perpendicular to and between the rear panel and the first plate, the side walls having openings for permitting filling of the cells with the light-transmissive fluid.

4. An electrophoretic display as claimed in claim 3 wherein the side walls are formed of electrically conducting metal, and wherein the collecting electrode of each cell in the layer of cells nearest the rear panel comprises a metal side wall.

5. An electrophoretic display as claimed in claim 2 wherein the collecting electrode of each cell in the layer of cells nearest the rear panel comprises a film of electrically conductive material deposited on the side walls.

6. An electrophoretic display as claimed in claim 2 wherein the counter or collecting electrode of each cell in the layer of cells nearest the rear panel comprises a film of electrically conductive material deposited on the interior wall of the hole associated with said each cell.

7. An electrophoretic display as claimed in claim 1 further comprising a solid state switch associated with each cell and located on the rear panel, each switch being electrically connected to the counter electrode of the associated cell.

8. An electrophoretic display as claimed in claim 1 wherein there are three cells in a stack, and wherein the pigment particles in the three stacked cells are colored magenta, cyan and yellow, respectively.

9. A reflective color electrophoretic display comprising:
   a light-reflective rear panel having a substantially planar horizontal surface;
   a substantially planar light-transmissive front window generally parallel to and spaced from the horizontal surface of the rear panel;
   first and second substantially planar light-transmissive plates located between the rear panel and front window and generally parallel to the horizontal surface of the rear panel;

a plurality of vertical side walls for spacing the first plate from the horizontal surface of the rear panel, the second plate from the first plate, and the front window from the second plate, the vertical side walls defining a plurality of stacks of three vertically-aligned cells, each cell in a stack containing a light-transmissive fluid and charged, light-absorbing pigment particles having a color different from the color of the pigment particles in the other two cells in the stack, each stack thereby forming a multicolored pixel;

an electrode on the cell-interior surface of the vertical side walls for collecting the charged pigment particles to substantially remove them from the path of light through the cell;

a counter electrode in each cell for distributing the pigment particles throughout the light-transmissive fluid of the cell to place the particles in the path of light through the cell; and a plurality of counter electrode driving elements on the horizontal surface of the rear panel, each driving element being associated with and electrically connected to a counter electrode.

10. An electrophoretic display as claimed in claim 9 wherein the first plate includes a plurality of holes, each hole associated with a cell, for permitting electrical connection from the driving elements on the rear panel to the counter electrodes in the cells between the first and second plates.

11. An electrophoretic display as claimed in claim 10 wherein the second plate includes a plurality of holes, each hole associated with a cell, for permitting electrical connection from the driving elements on the rear panel through the holes in the first plate and to the counter electrodes in the cells between the second plate and the front window.

12. An electrophoretic display as claimed in claim 11 wherein the counter electrode in each of the cells nearest the rear panel comprises an electrically conducting structure located in a hole of the first plate and having a passage, and further comprising a nesting wire located in the passage and electrically connected to a driving element and to a counter electrode in a cell between the second plate and the front window, the counter electrode in each of the cells nearest the rear panel thereby surrounding the nesting wire and shielding the electrophoretic suspension in the cell.

13. An electrophoretic display as claimed in claim 11 wherein the collecting electrodes in each of the cells are electrically connected together, whereby all of the collecting electrodes can be maintained at a common voltage level.

14. An electrophoretic display as claimed in claim 9 wherein the vertical side walls have openings for permitting filling of the cells with the light{-}transmissive fluid.

15. An electrophoretic display as claimed in claim 9 wherein the vertical side walls are formed of electrically conducting metal and wherein the cell-interior surface of the vertical metal side walls is the collecting electrode.

16. An electrophoretic display as claimed in claim 9 wherein the collecting electrode of each cell comprises a film of electrically conductive material deposited on the cell-interior surface of the vertical side walls.

17. An electrophoretic display as claimed in claim 9 wherein the driving elements comprise thin film transistor devices.

18. An electrophoretic display as claimed in claim 9 wherein the driving elements comprise metal-insulator-metal devices.

19. An electrophoretic display as claimed in claim 9 wherein the pigment particles in the three cells in each stack are colored magenta, cyan and yellow, respectively.

* * * * *